3,135,805
BIS(TERT-ALKYLPEROXY)ALKANES
Ernest R. Gilmont, Princeton, N.J., assignor to FMC
Corporation, a corporation of Delaware
No Drawing. Filed Jan. 14, 1959, Ser. No. 786,711
2 Claims. (Cl. 260—610)

This invention relates to a new class of organic peroxides, namely the bis(tert-alkylperoxy)alkanes, wherein two tertiary alkyl peroxy groups are linked together by a saturated four- or six-carbon-atom chain.

These peroxides may be represented by the following formula:

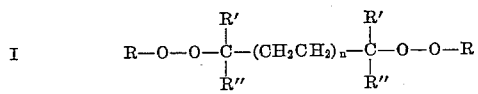

where $n$ is 1 or 2, R is tertiary alkyl radical, and R' and R" are either individual hydrocarbon radicals or are alkylene radicals connected to form a cycloalkylene radical. The hydrocarbon radicals, R' and R", may be alkyl, cycloalkyl, aralkyl, or aryl hydrocarbon radicals.

The peroxides of this invention have particular utilities by reason of their desirable combinations of physical and chemical properties. They are resistant to shock, and are stable against gradual decomposition on storage. Despite this high degree of stability, they are active polymerization catalysts and crosslinking agents under convenient conditions of use. Furthermore, they normally do not impart objectionable odors and tastes to polymers and crosslinked products prepared with them. The bis(tert-alkylperoxy)alkanes, in which R is a tertiary alkyl radical having four to eight carbon atoms and R' and R" are primary alkyl radicals having from one to eight carbon atoms, have been found to be particularly useful in these applications.

The peroxides of this invention may be prepared advantageously by reaction of a tertiary alcohol with a suitable bishydroperoxide:

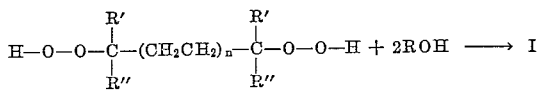

The reaction of the bishydroperoxide with the tertiary alcohol may be conducted by adding the alcohol to the hydroperoxide or by adding the hydroperoxide to the alcohol, and heating the resulting mixture to about 40° C. to 70° C., with stirring. The reaction takes place over about one to three hours, after which the reaction mixture is cooled to room temperature. The reaction mixture separates into an organic layer and an aqueous layer. The organic layer is collected, washed with alkali, and dried over a drying agent such as anhydrous magnesium sulfate to provide the bisperoxyalkane product. This product is concentrated by stripping off any excess alcohol or olefin. It may be used as is or purified further by distillation in vacuo.

Alternately, the present products may be prepared by reaction of a suitable tertiary hydroperoxide with a suitable bistertiary alcohol:

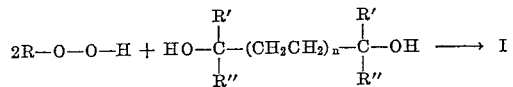

The following are exemplary bishydroperoxides which are useful in preparing the present bis(tert-alkylperoxy)alkanes by reaction of the bishydroperoxide with a tertiary alcohol:

2,5-dihydroperoxy-2,5-dimethylhexane
3,6-dihydroperoxy-3,6-dimethyloctane
2,5-dihydroperoxy-2,5-diphenylhexane
4,7-dihydroperoxy-2,4,7,9-tetramethyldecane
2,7-dihydroperoxy-2,7-dimethyloctane
1,1'-ethylenebis(hydroperoxycyclohexane)

The corresponding tertiary hydrocarbon glycols may be used in forming the present peroxide by reaction of the glycol with a suitable tertiary hydroperoxide.

Typical tertiary alcohols useful in forming the present peroxide by reaction of a bishydroperoxide with the alcohol include the following:

Tert-butyl alcohol
Tert-amyl alcohol
Tert-octyl alcohol(s)
Tert-decyl alcohol(s)

The corresponding tertiary hydroperoxides may be used to form the present peroxides by reaction of the tertiary hydroperoxide with a ditertiary hydrocarbon glycol.

The following examples of bisditertiary hydrocarbon peroxides and their preparation are included by way of illustration only, and are not to be deemed limitative of the present peroxides or methods of preparing them.

EXAMPLE 1

To a mixture of 593 g. of tert-amyl alcohol and 200 ml. of 70% sulfuric acid is added with stirring 178.2 g. of 2,5-dihydroperoxy-2,5-dimethylhexane. The mixture is heated slowly to 48° C., at which temperature most of the solid dissolves. Stirring is continued at 48° C. for two hours. The reaction mixture is then cooled to 20° C., whereupon it separates into two layers. The organic layer is washed with five 100-ml. portions of aqueous 25% sodium hydroxide and then dried over anhydrous magnesium sulfate. The excess alcohol and other volatile byproducts are removed by distillation at 50° C. (20 mm.), and the residue distilled under reduced pressure. The yield of 2,5-bis(tert-amylperoxy)-2,5-dimethylhexane boiling at 78–80° C. (0.03 mm.), amounts to 228 g. (71%).

*Analysis.*—Calcd. for $C_{18}H_{38}O_4$: C, 67.88; H, 12.03; mol. wt., 318.5; peroxidic O, 10.05. Found: C, 67.66; H, 11.86; mol. wt. (cryoscopy in benzene), 301; peroxidic O, 9.90.

EXAMPLE 2

A mixture of 250 ml. of 70% sulfuric acid, 741 g. of tert-butanol and 222 g. of 2,5-dihydroperoxy-2,5-dimethylhexane is heated to 60° C. for three hours, and the reaction mixture treated as in Example 1. This affords a yield of 266 g. (76%) of 2,5-bis(tert-butylperoxy)-2,5-dimethylhexane, a colorless liquid boiling at 52° C. (0.04 mm.).

*Analysis.*—Calcd. for $C_{16}H_{34}O_4$: C, 66.16; H, 11.80; mol. wt., 290.4; peroxidic O, 11.02. Found: C, 66.02; H, 11.66; mol. wt. (cryoscopy in benzene), 278; peroxidic O, 10.90.

EXAMPLE 3

A mixture of 206 g. of 3,6-dihydroperoxy-3,6-dimethyloctane, 593 g. of tert-butanol and 200 ml. of 70% sulfuric acid, is heated to 65° C. for two hours. The reaction mixture is then cooled, whereupon it separates into two layers. The organic layer is washed with five 100-ml. portions of 25% aqueous sodium hydroxide and dried over anhydrous magnesium sulfate. The volatiles are removed at 80° C. (17 mm.) leaving 258 g. (81%) of 3,6-bis(tert-butylperoxy)-3,6-dimethyloctane.

EXAMPLE 4

A mixture of 258 g. of 1,1'-ethylenebis(hydroperoxycyclohexane), 705 g. of tert-amyl alcohol and 200 ml. of 70% sulfuric acid, is heated to 48° C. for three hours, and then treated as in Example 3. This gives 306 g. (77%) of 1,1'-ethylenebis(tert-amylperoxycyclohexane).

EXAMPLE 5

A mixture of 302 g. of 2,5-dihydroperoxy-2,5-diphenylhexane, 593 g. of tert-butanol and 250 ml. of 70% sulfuric acid is heated to 68° C. for two hours. Treatment of the reaction mixture as in Example 3 gives 254 g. (61%) of 2,5-bis(tert-butylperoxy)-2,5-diphenylhexane.

The products of the examples upon analysis by the infrared technique, exhibit strong absorption bands in the 11.3 micron region, characteristic of dialkyl peroxides. The other features of their absorption spectra are consistent with the assigned structures.

The bis(tert-alkylperoxy)alkanes of the present invention find application as initiators in the preparation of useful polymers, for example by the homo- and co-polymerization of unsaturated monomers such as butadiene, styrene, vinyl chloride, vinylidene chloride, acrylonitrile, and the like. They also have particular advantage in the crosslinking of certain rubbers and plastics, as illustrated in the following example:

Crosslinking of Polyethylene

One hundred grams of a low-density polyethylene, having a molecular weight of about 39,000, is blended on a two-roll rubber mill at 240° F. with 50 g. of a thermal carbon black and 2 g. of 2,5-bis(tert-butylperoxy)2,5-dimethylhexane. The compounded polyethylene is then molded and cured in a steel mold having a one inch cube cavity, for 20 min. at 320° F.

The cured product has a percent compression, measured in a Williams compression tester at 250° F., of 1.9%. A one inch molded cube of the same batch of polyethylene not containing the peroxide, flows to a thin film under these test conditions. When cured at 320° F. for 20 min. in the form of a standard dumbell test specimen, the crosslinked polyethylene has a tensile strength of 2550 p.s.i., and an elongation at break of 360%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:
1. 1,1'-ethylenebis(tert-amylperoxycyclohexane).
2. 2,5-bis(tert-butylperoxy)-2,5-diphenylhexane.

References Cited in the file of this patent

UNITED STATES PATENTS

| | | |
|---|---|---|
| 2,455,569 | Dickey | Dec. 7, 1948 |
| 2,605,291 | Barusch et al. | July 29, 1952 |
| 2,813,127 | White | Nov. 12, 1957 |
| 2,916,481 | Gilmont | Dec. 8, 1959 |

OTHER REFERENCES

Kharasch et al.: Jour. Org. Chem., vol. 18 (March 1953), pp. 322–27 (6 pages).